L. J. CLERGY.
AUTOMOBILE BED.
APPLICATION FILED NOV. 26, 1920.
1,419,820.
Patented June 13, 1922.
2 SHEETS—SHEET 2.
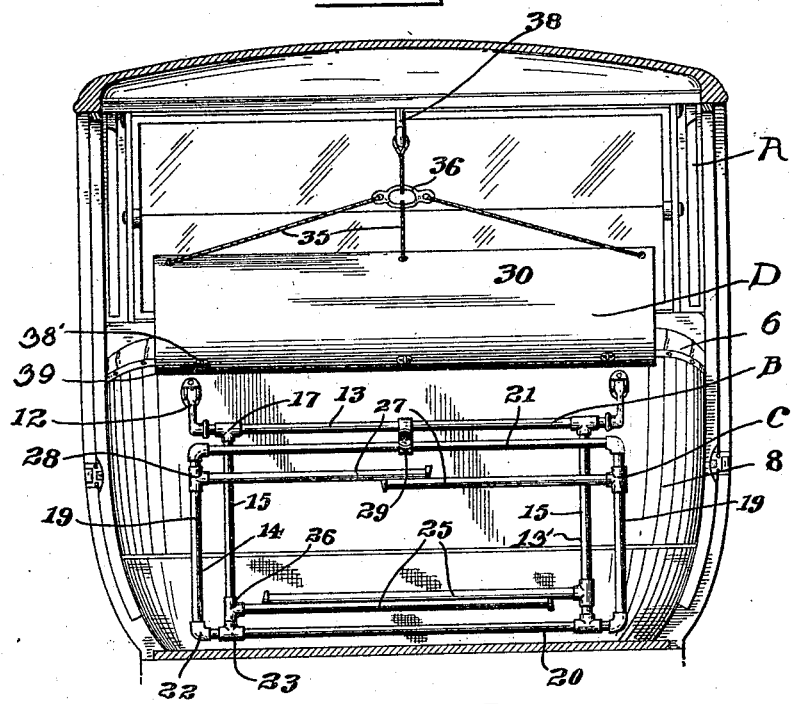
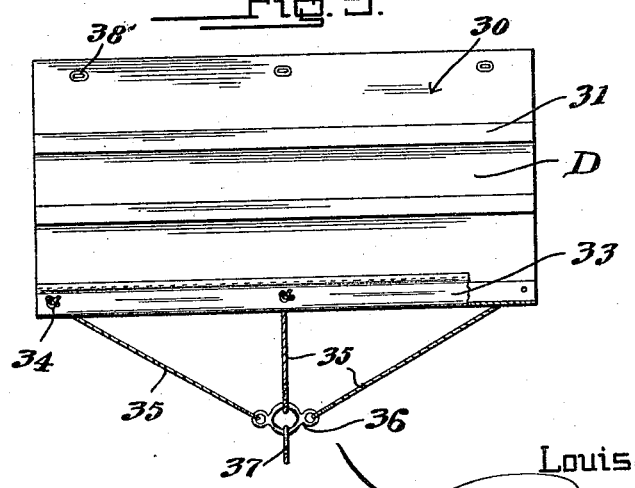
Inventor
Louis J. Clergy.

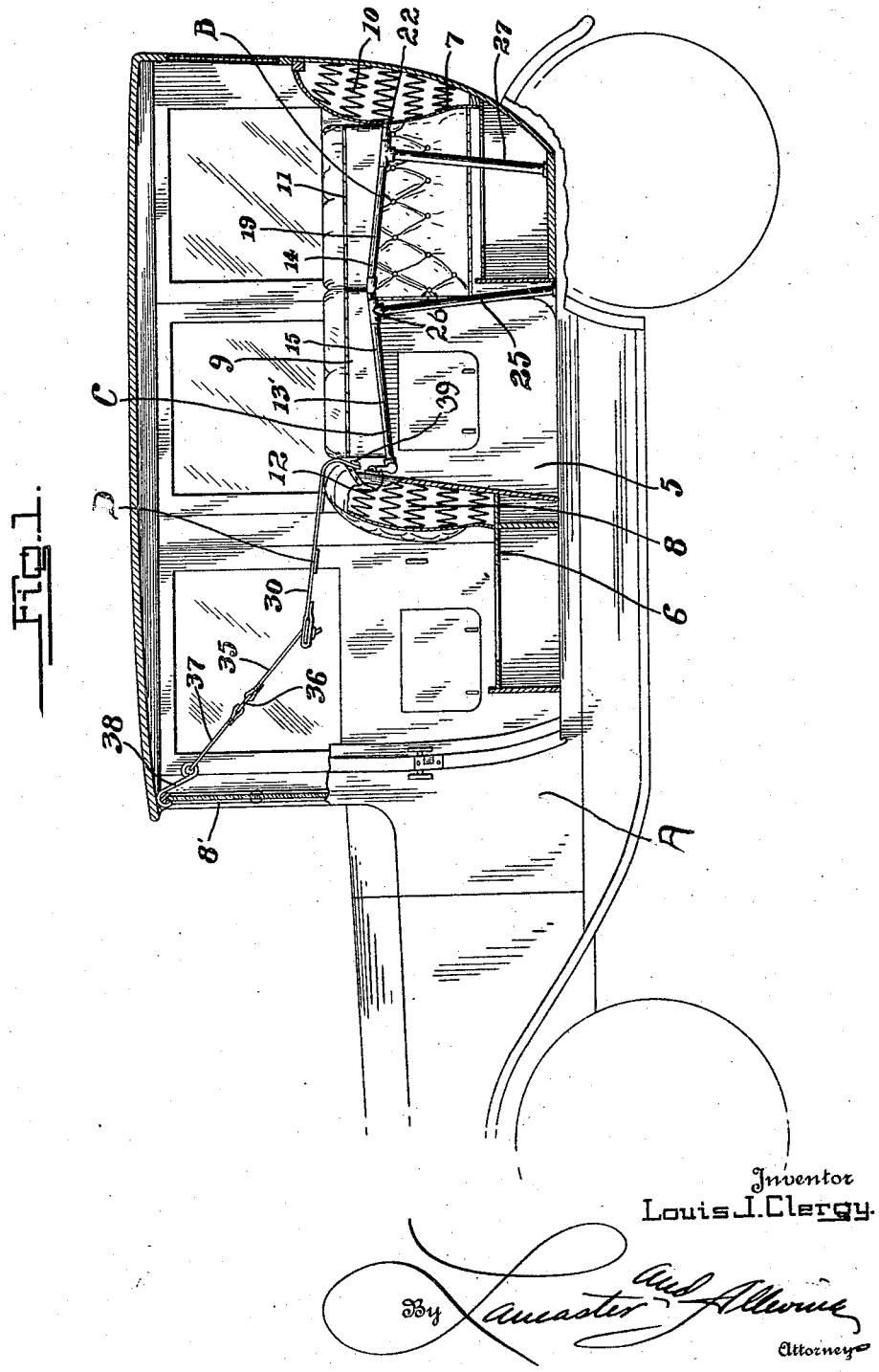

UNITED STATES PATENT OFFICE.

LOUIS J. CLERGY, OF BELT, MONTANA, ASSIGNOR TO LIBERTY MANUFACTURING COMPANY, OF BELT, MONTANA, A CORPORATION OF MONTANA.

AUTOMOBILE BED.

1,419,820. Specification of Letters Patent. Patented June 13, 1922.

Application filed November 26, 1920. Serial No. 426,519.

*To all whom it may concern:*

Be it known that I, LOUIS J. CLERGY, a citizen of the United States, residing at Belt, in the county of Cascade and State of Montana, have invented certain new and useful Improvements in Automobile Beds, of which the following is a specification.

This invention relates to attachments for motor vehicles of the touring or closed body type and the primary object of the invention is to provide an improved bed attachment for motor vehicles, so that the occupants thereof can have a place to rest or sleep, when on the road at night during travel.

Another object of the invention is to provide an improved bed attachment for motor vehicles which is so constructed that the same can be easily and compactly folded in an out of the way position in the vehicle body.

A further object of the invention is to provide an improved bed for motor vehicles embodying a folding frame carried by the ordinary robe rack of the vehicle, and a novel collapsible head rest, the frame being so arranged as to support the ordinary cushions of the front and rear seats of the vehicle, the cushions forming the mattress for the bed.

With these and other objects in view, the invention consists in the novel construction, arrangement and formation of parts as will be hereinafter more specifically described, claimed and illustrated in the accompanying drawings, forming a part of this specification, in which drawings:

Figure 1 is a longitudinal section through a motor vehicle showing the improved bed attachment therefor, the bed being in extended position.

Figure 2 is a transverse cross sectional view through the body of the motor vehicle, showing the frame of the bed in collapsed position, the head rest being in its extended or operative position, and Figure 3 is a bottom plan view of the head rest.

Referring to the drawings in detail, wherein similar reference characters designate like and corresponding parts throughout the several views, the letter A indicates a motor vehicle, and B, the improved bed attachment therefor.

The bed attachment B comprises the collapsible frame or body portion C and the head rest D.

The motor vehicle A may be of the usual or any preferred make or size and as shown includes the body 5 having the front and rear seats 6 and 7 and the windshield 8. The front seat 6 includes a back 8, a cushion 9, while the back seat 7 includes a back rest 10 and a cushion 11. As in the usual or ordinary construction, the back 8 of the front seat 6 has secured to its rear surface, the usual robe rack 12, which includes the transversely extending pivoted bar 13.

The base or frame C for the improved bed attachment B includes a pair of rectangular frames 13' and 14, which are adapted to be folded into engagement with each other when the bed is not in use. The forward rectangular frame 13' includes the side bars 15, the forward ends of which carry sleeves 17, which are rotatably mounted upon the bar 13 of the robe rack 12. It is preferred that the frames 13' and 14 be constructed out of pipe lengths and pipe joints. The inner ends of the arms 15 have T-joints connected thereto, which form the collars 17 for connection with the bar 13.

The rectangular frame 14 includes side bars 19 and forward and rear cross bars 20 and 21. The side and end bars 19, 20 and 21 are connected together by elbow joints 22. The rear ends of the side bars 15 of the front frame 13 carry the T-joints 23 and these T-joints form collars for rotatably receiving the forward end bar 20 of the rear frame 14. The rear ends of the side bars 15 also have connected thereto legs 25 and the inner end of these legs 25 carry T-joints 26, which form sleeves that rotatably receive the side bars 15. It can be seen that these legs 25 may be swung on the side bars 15 so as to extend downwardly therefrom at right angles to form a support for the frame 13' when the frame 13' is in its raised or horizontal position, or they may be swung inwardly toward each other so as to lie in the same plane as the side bars 15.

Legs 27 are also provided for the rear frame, and the inner ends of these legs also have connected thereto T-joints 28 which form sleeves for rotatably receiving the side bars 19. These legs are formed relatively shorter than the legs 25 and are also adapted to extend downwardly at right angles to the side bars 19 of the frame 14 when the same is in its raised horizontal position. The legs 27 are also adapted to be swung inwardly toward each other and lie in the same plane with the side bars 19 and the forward and rear bars 20 and 21. The frame 14 is adapted to be folded against the frame 13' and the frame 13' is adapted to be swung downwardly on the bar 13 of the rack 12 into engagement with the rear surface of the back 8 of the front seat 6. In order to hold the frames against rattling and displacement from engagement with the rear surface of the seat 6, a removable spring clasp 29 is provided, for engaging the bar 13 of the rack 12 and the rear bar 21 of the rear frame 14. The lower ends of the legs 25 and 27 are provided with feet 32, the lower ends of which are angled for a purpose which will hereinafter appear.

The head rest D of the bed B is preferably formed of flexible material, such as canvas, leather or the like, and includes a rectangular body 30 which is strengthened by flexible strips 31. The forward end of the rectangular body 30 is folded back as at 33 and has a plurality of eyelets 34 formed therein for the reception of ropes 35. These ropes 35 are connected to a ring 36. This ring, in turn, carries a flexible member 37, the forward end of which is provided with a hook 38 which fits over the windshield 8'. The rear edge of the flexible body 30 is provided with a plurality of eyelets 38' which are adapted to receive studs 39 carried by the rear surface of the seat 6. These studs 39 are arranged adjacent to the upper edge of the seat back 8 as clearly shown in Figure 1 of the drawings.

When it is desired to use the bed, the spring clasp 29 is removed from the rod 13 and the rear end bar 21 of the rear frame 14 and these frames are pulled rearwardly into a substantially horizontal position as shown in Figure 1 of the drawings. The front and rear pair of legs 25 and 27 are then moved downwardly at right angles to the frames 13 and 14 into engagement with the floor of the body 5 of the vehicle A. The rear legs 27 are placed within the usual seat support of the rear seat, as clearly shown in Figure 1 of the drawings. As heretofore stated, the pair of legs 25 are formed relatively longer than the legs 27 which hold the central portion of the frame or body portion C of the bed in an elevated position. Thus it can be seen that the frames 13 and 14 slope forwardly and rearwardly from the legs 25. The cushions 9 and 11 of the front and rear seats 6 and 7 are then placed upon the front and rear frames 13 and 14. The inclination of the frames 13 and 14 conforms to the configuration of the cushions 9 and 11 which are of the usual construction and thus hold the upper surface of these cushions in a spaced horizontal plane. In order that the frames can slope forwardly and rearwardly to conform to the configuration of the cushions, the legs 25 and 27 extend at a slight angle to the vertical and it can be seen that the bevelled ends of the feet 32 permit a firm engagement between the feet and the floor of the car. The upper surface of these cushions are in substantially the same plane as the upper edge of the forward seat back 8. The head rest D may be placed in engagement with the studs 39 prior to the placing of the cushions 9 and 11 in position and after the head rest D is placed in position the hook 38 is placed over the upper end of the windshield 8' as clearly shown in the drawings. This forms a complete bed which is of sufficient width for two or three persons. The frame or body portion C supports the entire weight of the persons lying upon the bed B and the head rest D merely forms a rest for the head of the user.

From the foregoing description, it can be seen that an exceptionally simple and durable bed attachment has been provided for motor vehicles, which can be quickly and easily moved to an extended operative position or to a collapsed inoperative position and which is so constructed as to utilize the seat cushions for forming the mattress portion thereof.

Changes in details may be made without departing from the spirit or scope of this invention; but,

I claim:

1. The combination with a motor vehicle including front and rear seats, of a robe rack carried by the rear surface of the front seat, the seats having removable cushions, of a bed including a pair of pivotally connected frames, means connecting the forward end of one of the frames to the robe support, pivoted legs carried by the frames arranged to engage the floor of the motor vehicle, and a head rest detachably carried by the front seat and the forward end of the vehicle.

2. The combination with a motor vehicle including front and rear seats having removable cushions, of a bed attachment therefor including a pair of pivotally connected frames, means pivotally connecting one of the frames to the rear surface of the front seat, pairs of pivoted legs carried by the frames, the frames being adapted to support the removable seat cushions, and a flexible head rest arranged to extend in alignment with the upper surface of the cushions, when the same are placed on the frames, and means for connecting the flexible head rest to the vehicle.

3. An automobile bed comprising a pair of pivotally connected frames adapted to be folded in relation to each other, pivoted legs carried by the frames, means for pivoting one of the frames to one of the seats of the automobile, removable cushions arranged on the frames, and a removable collapsible head rest adapted to be associated with one of the seat backs of the automobile.

4. An automobile bed comprising a pair of rectangular frames, means hingedly connecting the frames together, means for pivotally connecting one of the frames to one of the automobile seats, pairs of legs pivotally carried by the frames, one of the pair of legs being formed relatively longer than the other pair of legs, cushions arranged on said frames, and a flexible foldable head rest, and means carried by the head rest for detachable connection with a motor vehicle.

5. An automobile bed comprising a pair of frames, means pivotally connecting the meeting ends of the frames together, means pivotally connecting the forward end of the forward frame to one of the seats of the motor vehicle, a pair of legs pivotally connected to the forward frame adjacent to its rear end, a pair of pivoted legs connected to the rear frame adjacent to its rear end, the first mentioned pair of legs being formed relatively longer than the last mentioned pair of legs, so as to hold the frames at an incline, seat cushions arranged on the upper surface of the frames, feet formed on the lower ends of the legs having angled faces, and a collapsible and flexible head rest arranged in operative relation to the cushions and detachably connected to the automobiles.

LOUIS J. CLERGY.